(12) United States Patent
Brug et al.

(10) Patent No.: US 9,372,349 B2
(45) Date of Patent: Jun. 21, 2016

(54) GLASSES-FREE 3D DISPLAY FOR MULTIPLE VIEWERS WITH A RESONANT SUBWAVELENGTH LENS LAYER

(75) Inventors: James A Brug, Menlo Park, CA (US); David A Fattal, Mountain View, CA (US); Huei Pei Kuo, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 144 days.

(21) Appl. No.: 14/126,736

(22) PCT Filed: Jun. 30, 2011

(86) PCT No.: PCT/US2011/042715
§ 371 (c)(1),
(2), (4) Date: Dec. 16, 2013

(87) PCT Pub. No.: WO2013/002808
PCT Pub. Date: Jan. 3, 2013

(65) Prior Publication Data
US 2014/0111856 A1     Apr. 24, 2014

(51) Int. Cl.
*G02B 27/22* (2006.01)
*G02B 5/18* (2006.01)
*H04N 13/04* (2006.01)

(52) U.S. Cl.
CPC .......... *G02B 27/2214* (2013.01); *G02B 5/1809* (2013.01); *G02B 5/1842* (2013.01); *H04N 13/0402* (2013.01)

(58) Field of Classification Search
CPC ............. G02B 27/2214; G02B 5/1809; G02B 5/1842; G02B 27/2228; G02B 27/225; G02B 27/30
USPC .......................... 359/462, 463, 458; 345/419
See application file for complete search history.

(56) References Cited

U.S. PATENT DOCUMENTS 6,975,765 B2   12/2005   McGrew et al.
7,595,927 B2    9/2009   Ishii et al.
(Continued)

FOREIGN PATENT DOCUMENTS

CN   101098415 A   1/2008
CN   101218833 A   7/2008
(Continued)

OTHER PUBLICATIONS

PCT Search Report/Written Opinion—Application No. PCT/US2011/042715—dated Feb. 28, 2012—12 pages.
(Continued)

*Primary Examiner* — Darryl J Collins
*Assistant Examiner* — Journey Sumlar
(74) *Attorney, Agent, or Firm* — HP Inc. Patent Department

(57) ABSTRACT

A light field display for providing continuous 3D images to viewers at multiple views is provided. The light field display includes a pixel layer having a plurality of pixel layer elements, a resonant subwavelength lens layer having a plurality of resonant subwavelength lenses and a circuit board connected to the pixel layer and the resonant subwavelength lens layer. Each resonant subwavelength lens in the resonant subwavelength lens layer is integrated with an element in the pixel layer. The element may be either a pixel or a subpixel, such that each image view may be provided per pixel or subpixel in the pixel layer.

20 Claims, 11 Drawing Sheets

(56) References Cited

U.S. PATENT DOCUMENTS

| | | |
|---|---|---|
| 7,839,549 B2 | 11/2010 | Mihajlovic |
| 2006/0170616 A1 | 8/2006 | Hirayama et al. |
| 2007/0035829 A1 | 2/2007 | Woodgate |
| 2007/0103782 A1 | 5/2007 | Lee |
| 2008/0011937 A1* | 1/2008 | Toshikiyo .................. 250/208.1 |
| 2008/0036759 A1 | 2/2008 | Koike |
| 2008/0204872 A1* | 8/2008 | Ijzerman et al. .............. 359/463 |
| 2008/0239420 A1 | 10/2008 | McGrew |
| 2009/0315883 A1 | 12/2009 | King |
| 2010/0253995 A1 | 10/2010 | Reichelt |

FOREIGN PATENT DOCUMENTS

| | | |
|---|---|---|
| CN | 101395728 A | 3/2009 |
| CN | 102067612 A | 5/2011 |
| EP | 1486803 | 12/2004 |
| EP | 1995794 | 11/2008 |
| JP | 2001108812 | 4/2001 |
| JP | 7230005 | 10/2008 |
| JP | 2010-212625 | 9/2010 |
| KR | 10-2004-0029755 | 4/2004 |
| WO | WO-2007008766 | 1/2007 |
| WO | WO-2010109170 | 9/2010 |

OTHER PUBLICATIONS

Pastoor, Siegmund et al. "3-D displays: A review of current technologies." Displays 17.2 (1997): 100-110.

European Search Report, Hewlett-Packard Development Company, LP, Application No. 11868517.1. European Patent Office. Report issued Feb. 3, 2015.

Matt, Joseph N., et al. "Design of binary subwavelength diffractive lenses by use of zeroth-order effective-medium theory." JOSAA vol. 16, No. 5 (1999): pp. 1157-1167.

* cited by examiner

GLASSES-FREE 3D DISPLAY FOR MULTIPLE VIEWERS WITH A RESONANT SUBWAVELENGTH LENS LAYER

BACKGROUND

Light field displays have emerged to provide viewers a more accurate visual reproduction of three-dimensional ("3D") real-world scenes without the need for specialized viewing glasses. Such displays emulate a light field, which represents the amount of light traveling in every direction through every point in space. The goal is to enable multiple viewers to simultaneously experience a true 3D stereoscopic effect from multiple viewpoints, by capturing a light field passing through a physical surface and emitting the same light field using a display screen. Doing so has the potential to revolutionize many visual-based applications in areas as diverse as entertainment, business, medicine, and art, among others.

Examples of currently available light field displays include those based on holographic gratings, parallax barriers, or lenticular lenses. Holographic displays often require very large data rates and suffer from optical inefficiencies due to their use of interference to steer the light. They also produce blurred images when illuminated with different wavelengths, and as a result, have thus far been of limited use in commercial applications. Parallax- and lenticular-based displays rely on existing two-dimensional ("2D") display technology and are therefore less costly to implement, but also suffer from poor image quality and a limited viewing angle.

Parallax barriers have narrow apertures that control the direction of light and also block most of the light from the pixels, which makes them very inefficient when a large number of views are used. Lenticular lenses steer the light by conventional refraction at an optical interface and require a relatively long focal length because of spherical aberration. This limits the viewing angel and also results in cross-talk (ghosting) from light from adjacent pixels entering the wrong lens.

A common theme among these displays is the difficulty to fabricate displays with light fields that are controlled with precision at the pixel level in order to achieve good image quality for a wide range of viewing angles.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

A glasses-free 3D display for multiple viewers and viewing angles is disclosed. The display is formed of a novel resonant subwavelength lens layer that includes an array of resonant subwavelength lenses ("RSLs") to change the wavefront of incident light. As generally described herein, an RSL includes a substrate and a sub-wavelength grating ("SWG") composed of a thin two-dimensional array of posts that extend perpendicular from a planar surface of the substrate. The posts are configured in an SWG pattern having a period smaller than the wavelength of incident light (hence the "subwavelength" designation) and are fabricated form a thin film of a high index material, such as, for example, amorphous silicon ("a-Si"), silicon nitride ("Si3N4"), among others. The substrate can be composed of a material having a relatively lower refractive index than the posts in the SWG, such as, for example, quartz, silicon dioxide ("$SiO_2$"), aluminum oxide ("$Al_3O_2$"), or a polymer, among others.

An incident photon on the RSL is stored momentarily in the grating and re-emitted with a phase that depends on the dimensions of the posts in the RSL, the index of refraction, and the wavelength of the light. By varying the dimensions of the posts in the RSLs, the incident light can be steered (in the case of a linear variation in phase) or focused (for a parabolic variation).

In various embodiments, the RSL layer is provided on top of a pixel layer to collimate and or deflect the incident light emitted at a given location in the pixel plane to a particular output angle with a controlled vertical and horizontal angular spread. The pixel layer is formed of multiple pixels in the form of an array of subpixels, with each subpixel corresponding to single color elements that are separately addressable. The RSL and pixel layers may be designed such that each pixel or subpixel provides a different view or a different image at a well-defined direction or viewing angle. Using the RSL array instead of a standard microlens or lenticular array reduces cross-talk between pixels that cause ghosting, improves efficiency, limits aberration, and simplifies the fabrication and assembly processes.

It is appreciated that, in the following description, numerous specific details are set forth to provide a thorough understanding of the embodiments. However, it is appreciated that the embodiments may be practiced without limitation to these specific details. In other instances, well known methods and structures may not be described in detail to avoid unnecessarily obscuring the description of the embodiments. Also, the embodiments may be used in combination with each other.

Figure 1:
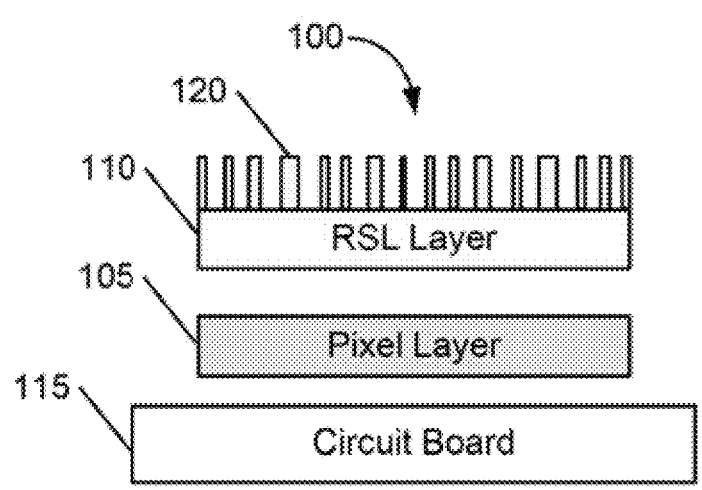
FIG. 1 illustrates a schematic diagram of a light field display in accordance with various embodiments.

Referring now to FIG. 1, a schematic diagram of a light field display in accordance with various embodiments is described. Light field display 100 includes a pixel layer 105, an RSL layer 110, and a circuit board 115. The pixel layer 105 consists of multiple elements, including pixels and subpixels. Each pixel (e.g., from 1024×600, 1920×1080, etc., pixels) is formed of an array (e.g., 4×4, 5×5, etc.) of subpixels. Each subpixel corresponds to a single color elements (e.g., R/G/B) that is separately addressable and that generates light for one view of the multiview display. The RSL layer 110 is composed of multiple RSLs to deflect incident light beams from the pixel layer 105 at multiple directions. Each RSL has an array of thin two-dimensional posts 120, as described in more detail below. As appreciated by one skilled in the art, the circuit board 115 may provide processors, memory, sensors, and other electronic devices for handling communications, pixel/subpixel addressing, and data processing for the display 100.

Figure 2:
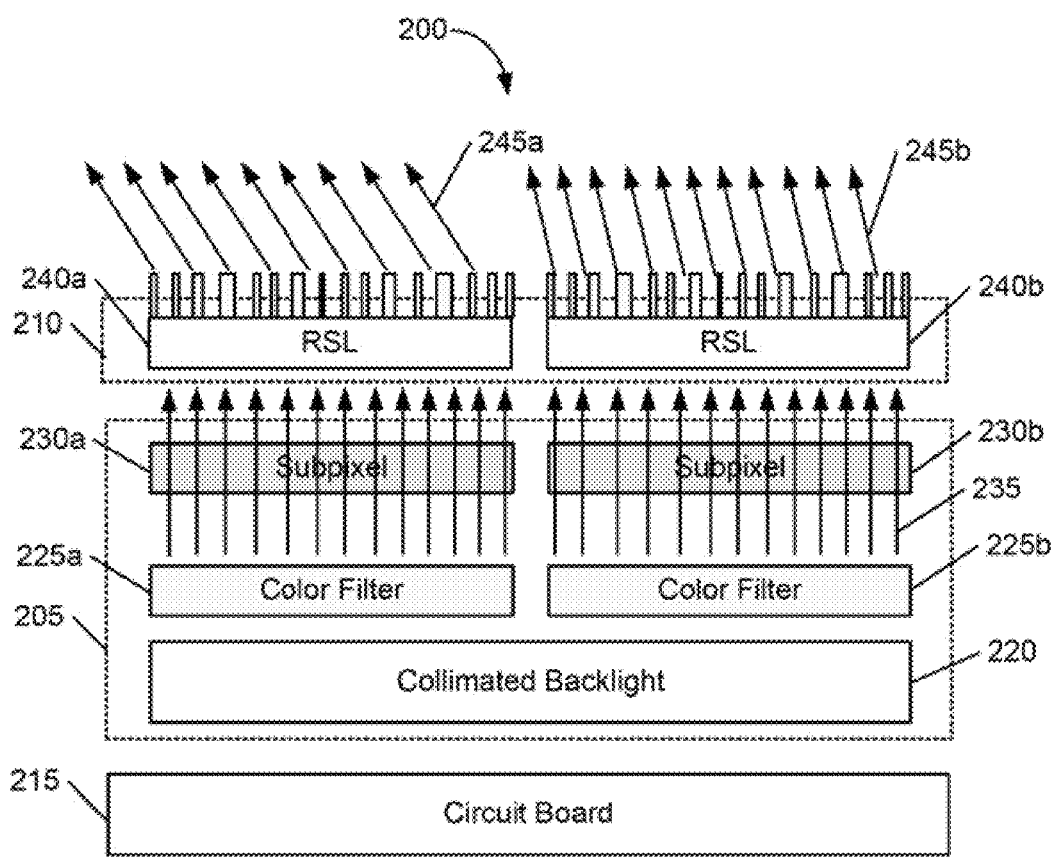
FIG. 2 illustrates a more detailed schematic diagram of an example light field display of FIG. 1 in accordance with various embodiments.

FIG. 2 illustrates a more detailed schematic diagram of an example light field display of FIG. 1 in accordance with various embodiments. Light field display 200 has a pixel layer 205, an RSL layer 210, and a circuit board 215. The pixel layer 205 includes a light source 220, a color filter array, and multiple pixels in a shutter panel, with each pixel formed of an array of subpixels, such as subpixels 230a-b. The light source 220 may be, for example, a collimated backlight that provides a uniform source of collimated (i.e., minimally dispersed, nearly parallel) white light beams 235. The white light beams 235 are converted into color by the color filter array, which contains multiple color filters, with one color filter per subpixel (e.g., color filter 225a for subpixel 230a and color filter 225b for subpixel 230b). Each subpixel corresponds to a single color element (e.g., R/G/B) that is separately addressable. It is appreciated that the light source 220 may be separated from the color filter array by a gap.

In various embodiments, the RSL layer 210 is composed of multiple RSL arrays, with one RSL array per pixel. Each RSL array has multiple RSLs, with a separate RSL coupled to each subpixel. For example, RSL 240a is used to deflect the light beams 235 from subpixel 230a into light beams 245a at a given direction and RSL array 240b is used to deflect the light beams 235 from subpixel 230b into light beams 245b at another direction. It is appreciated that each RSL (e.g., RSL 240a and RSL 240b) in the RSL layer 210 may be used to deflect light into a small horizontal direction (e.g., smaller than 10 degrees and a large angle in the vertical direction (e.g., large than 60 degrees), thereby generating multiple image views. Because each RSL in the RSL layer 210 is closely coupled to its corresponding subpixel (e.g., RSL 240a for subpixel 230a, RSL 240b for subpixel 230b, and so on), the deflected light from each subpixel has a well-defined direction or viewing angle. This limits cross-talk between pixels that cause ghosting, improves efficiency, limits aberration, and allows the RSLs to be defined for a narrow range of wavelengths corresponding to each color.

As appreciated by one skilled in the art, RSL layer 210 and pixel layer 205 are respectively shown with two RSLs (i.e., RSLs 240a-b) and two subpixels (i.e., subpixels 230a-b) and two color filters (i.e., color filters 225a-b) for illustration purposed only. In practice, the RSL layer and the pixel layer in a light field display build in accordance with various embodiments contains many RSL arrays, pixels, and color filters. For example, a light field display 200 may include 1920×1080 pixels with each pixel having a corresponding RSL array (with one RSL in the RSL array couples to one subpixel) and a corresponding color filter.

Figure 3:
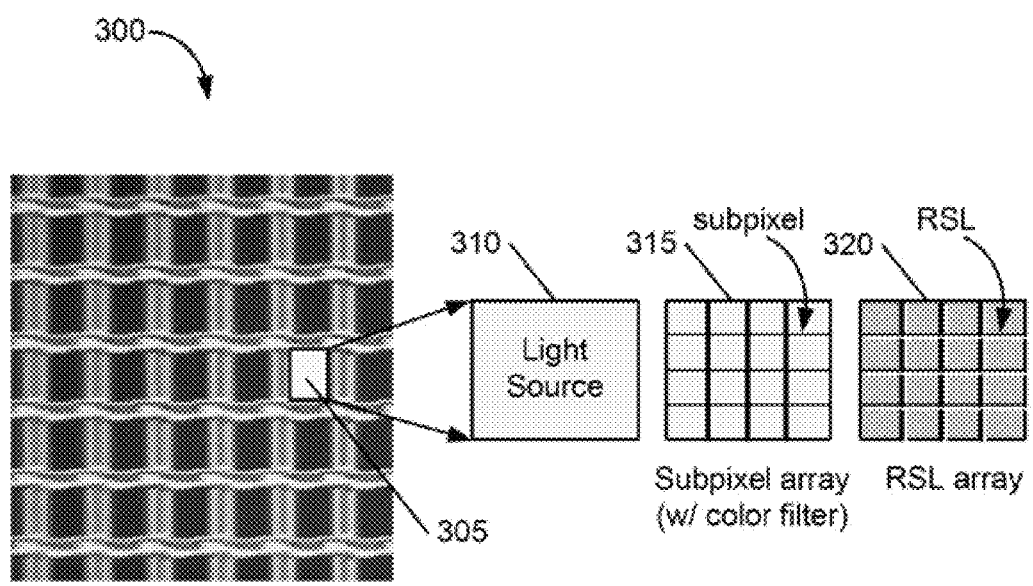
FIG. 3 illustrates a schematic diagram of the example light field display of FIG. 2 showing multiple pixels.

Attention is now directed to FIG. 3, which illustrates a schematic diagram of the example light field display of FIG. 2 showing multiple pixels. Light field display 300 includes many (e.g. 1920×1080) pixels, with each pixel (such as pixel 305) being illuminated with a uniform source of collimated white light 310. Each pixel consists of an array of subpixels (e.g., a LCD shutter array of subpixels), such as the 4×4 subpixel array 315 having 16 subpixels. Each subpixel provides a different view. In this example with 16 subpixels and 16 views, a 64° viewing angle would have each subpixel deflecting light over 4° horizontally and 64° vertically. To scale the light field display 300 to a larger number of viewing angles, a denser array of subpixels may be used with a corresponding array of RSLs.

The RSL layer coupled to the pixel layer is composed of a separate RSL array for each pixel, such as RSL array 320 for pixel 305. RSL array 320, in turn, is an array of RSLs, with a separate RSL couples to each subpixel in the pixel array 315. In one embodiment, a pixel may be on the order of 1 mm in size and a subpixel may be on the order of 200 μm×100 μm in size. As appreciated by one skilled in the art, these size figures are illustrative. Different light fields displays may be fabricated with a different number of pixels, pixel arrays, and corresponding RSL arrays at different dimensions.

Figure 4:
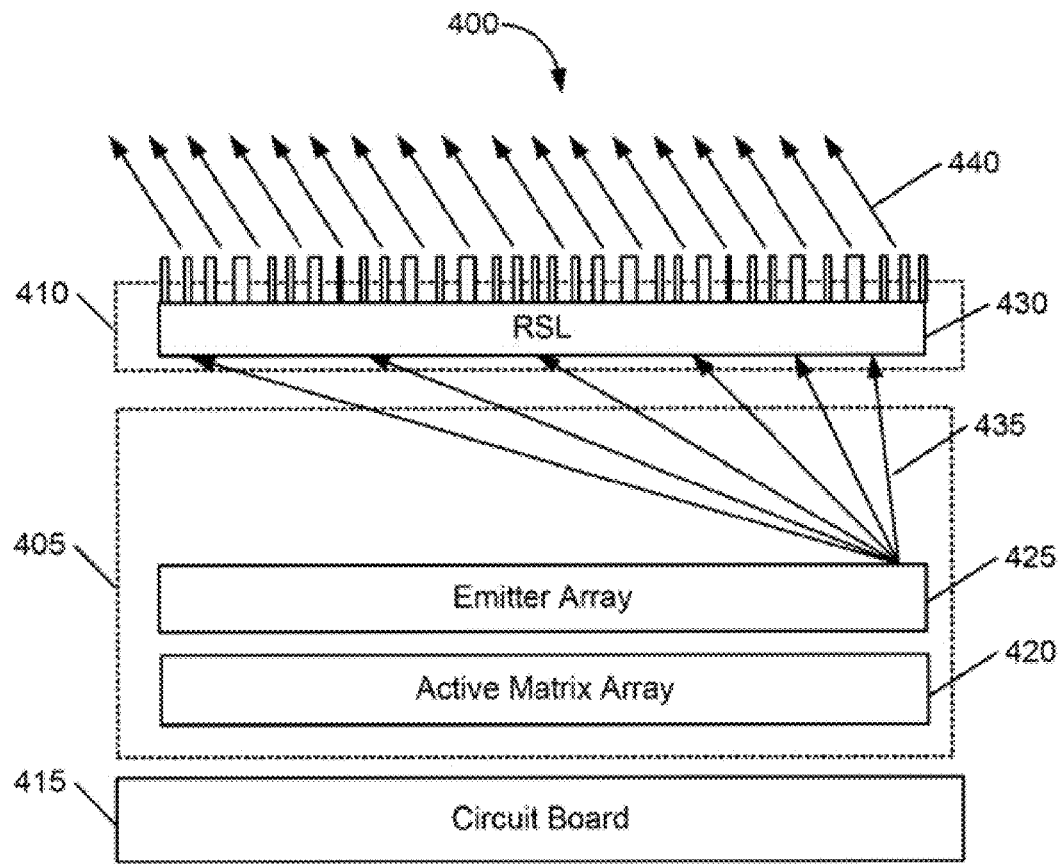
FIG. 4 illustrates a more detailed schematic diagram of another example of a light field display of FIG. 1 in accordance with various embodiments.

Referring now to FIG. 4, a more detailed schematic diagram of another example of a light field display of FIG. 1 in accordance with various embodiments is described. Light field display 400 includes a pixel layer 405, an RSL layer 410, and a circuit board 415. The pixel layer 405 consists of multiple (e.g., 1024×600, 1920×1080, etc.) pixels, with each pixel formed of an active matrix array and an emitter array, such as, for example, active matrix array 420 and emitter array 425 corresponding to a single pixel in the pixel layer 405. As understood by one skilled in the art, an active matrix array consists of an array (e.g., 4×4, 5×5, etc.) of subpixels. Each subpixel corresponds to a single color element (e.g., R/G/B) that is separately addressable. The emitter array 425 may be, for example, an array of multiple OLED elements.

The RSL layer 410 is composed of multiple RSLs (e.g., RSL 430) to deflect incident light beams 435 from the pixel layer 405, as described in more detail below. In this embodiment, incident light beams 435 enter the RSL layer 410 at different angles and a single RSL (e.g., RSL 430) is used to steer the light for a single pixel. The direction of the light beams 440 deflected by the RSL 430 is provided by the spacing of each OLED element in the emitter array 425.

Figure 5:
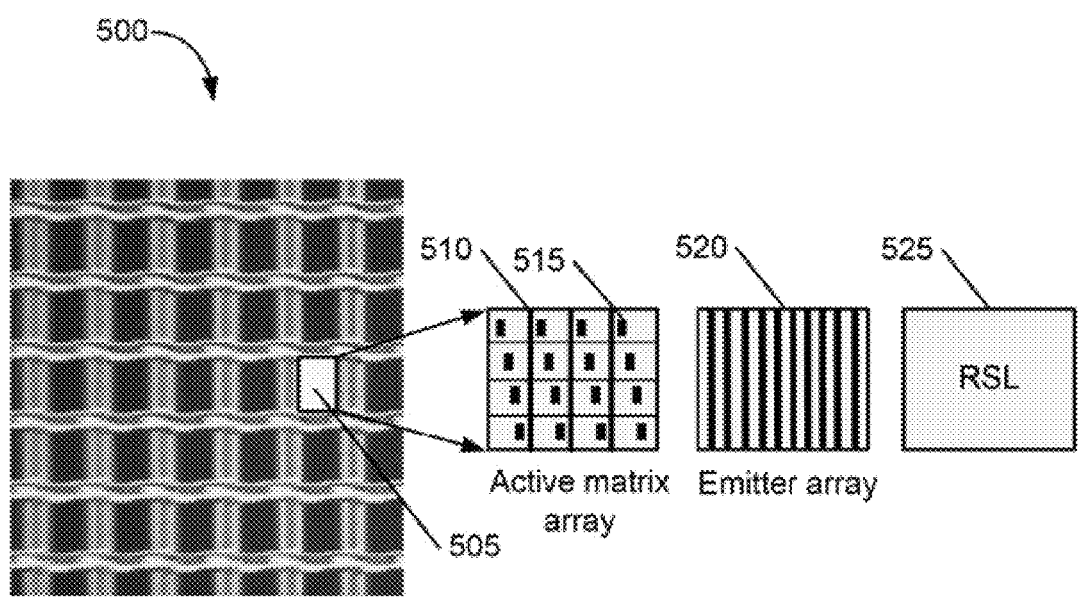
FIG. 5 illustrates a schematic diagram of the example light field display of FIG. 4 showing multiple pixels.

FIG. 5 shows a schematic diagram of the example light field display of FIG. 4 in more details. Light field display 500 includes a pixel layer having many (e.g., 1920×1080) pixels, with each pixel (e.g., pixel 505) being formed of an active matrix array and an emitter array, such as active matrix array 510 and emitter array 520 for pixel 505. The active matrix array 520 is composed of a 4×4 array of 16 subpixels, with each subpixel having a via (e.g., via 515). The emitter array 520 has 16 OLED emitters (corresponding to the 16 subpixels) that are very narrow in the horizontal direction but extend the width of the pixel in the vertical direction. Each emitter in the emitter array 520 makes contact to a subpixel in the active matrix array 510 by overlaying a via (e.g., via 515).

The RSL layer coupled to the pixel layer in the light field display 500 is composed of a single RSL for each pixel, such as RSL 525 for pixel 505. In this embodiment, the spacing of each OLED emitter provides a different angle of deflection. The RSL 525 may be a cylindrical lens, or any other shaped RSL that provides a different angle of deflection based on the spacing of the OLEDs in the emitter array 520. It is appreciated that the 16 subpixels are shown for illustration purposes only. A light field display may be designed to provide a larger number of viewing angles by using a denser array of subpixels (e.g., 5×5, 6×6, etc.) with a corresponding RSL.

Figure 6:
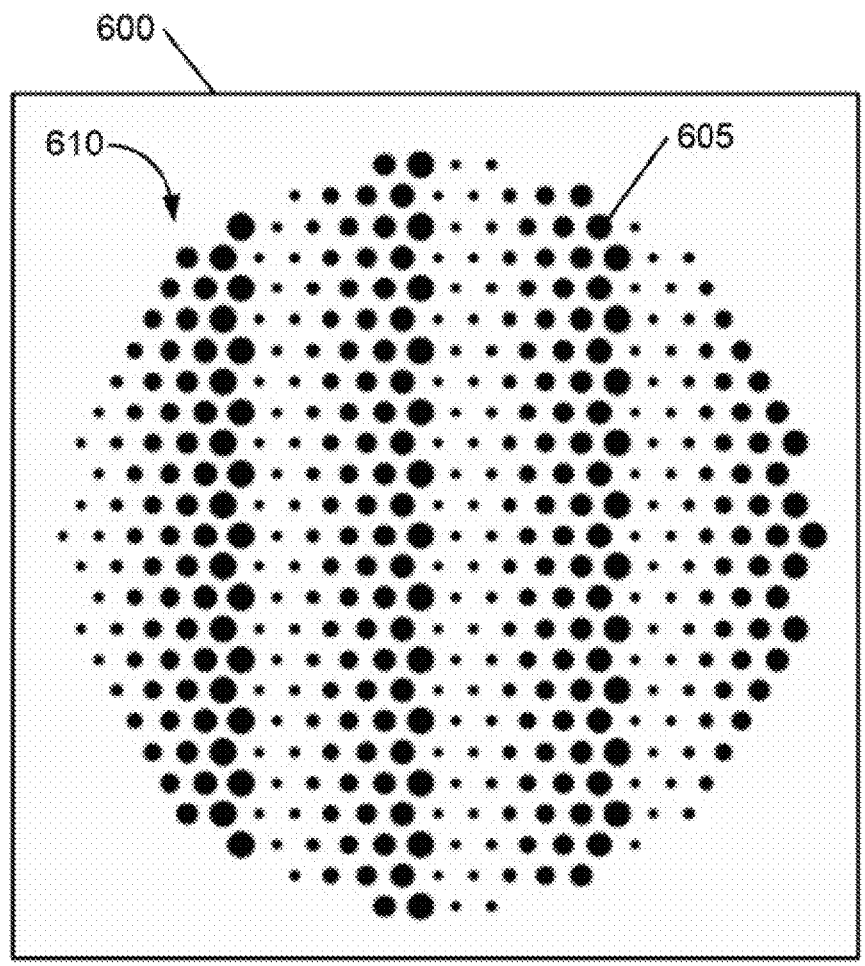
FIG. 6 illustrates a schematic diagram of an example RSL.

A schematic diagram of an example RSL is shown in FIG. 6. RSL 600 has a series of line segments or posts that are fabricated from a thin film of a high index material, such as, for example, amorphous silicon ("a-Si"), silicon nitride ("Si3N4"), among others. The posts (e.g., post 605) are configured in a cylindrical sub-wavelength grating ("SWG") pattern 610 having a period smaller than the wavelength of incident light. In various embodiments, the posts may have varying diameters (e.g., 200 nm) and extend perpendicular from a planar surface of a very thin substance (e.g., on the order of 120 nm). The posts may be designed such that light is mostly transmitted while undergoing an arbitrary phase front transformation, including but not restricted to a focusing and/or deflecting transformation. As incident photon is momentarily stored in the RSL 600 and re-emitted with a phase that depends on the dimensions of the RSL 600, the index of refraction, and the wavelength of the light.

Figure 7A:
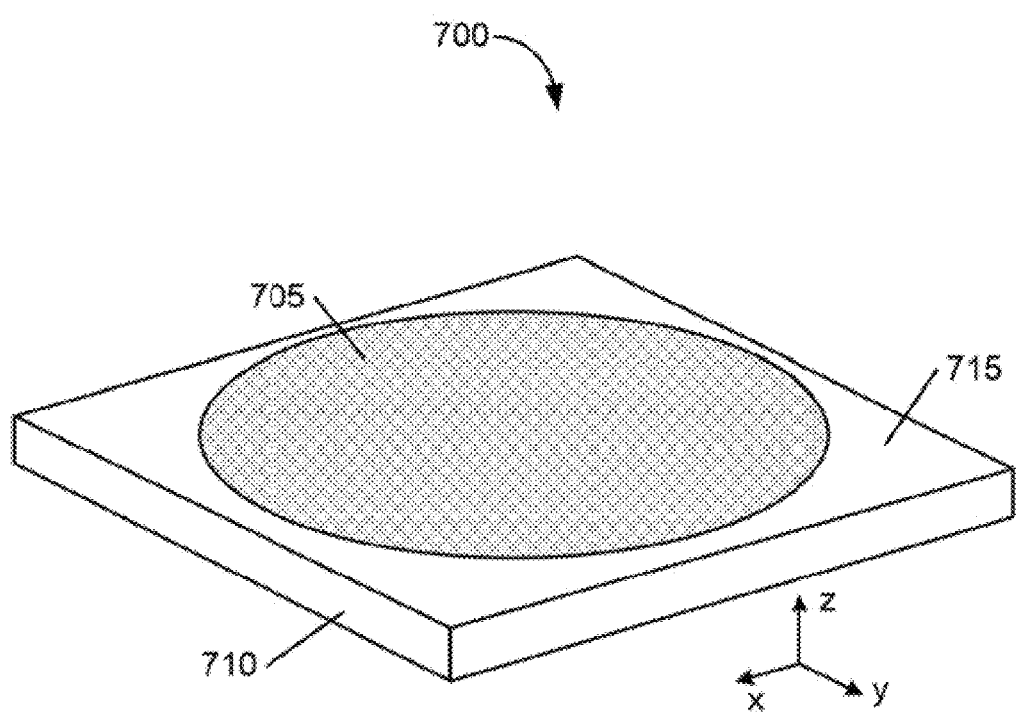
FIG. 7A-B illustrate schematic diagrams showing isometric and top views of an example RSL.
Figure 7B:
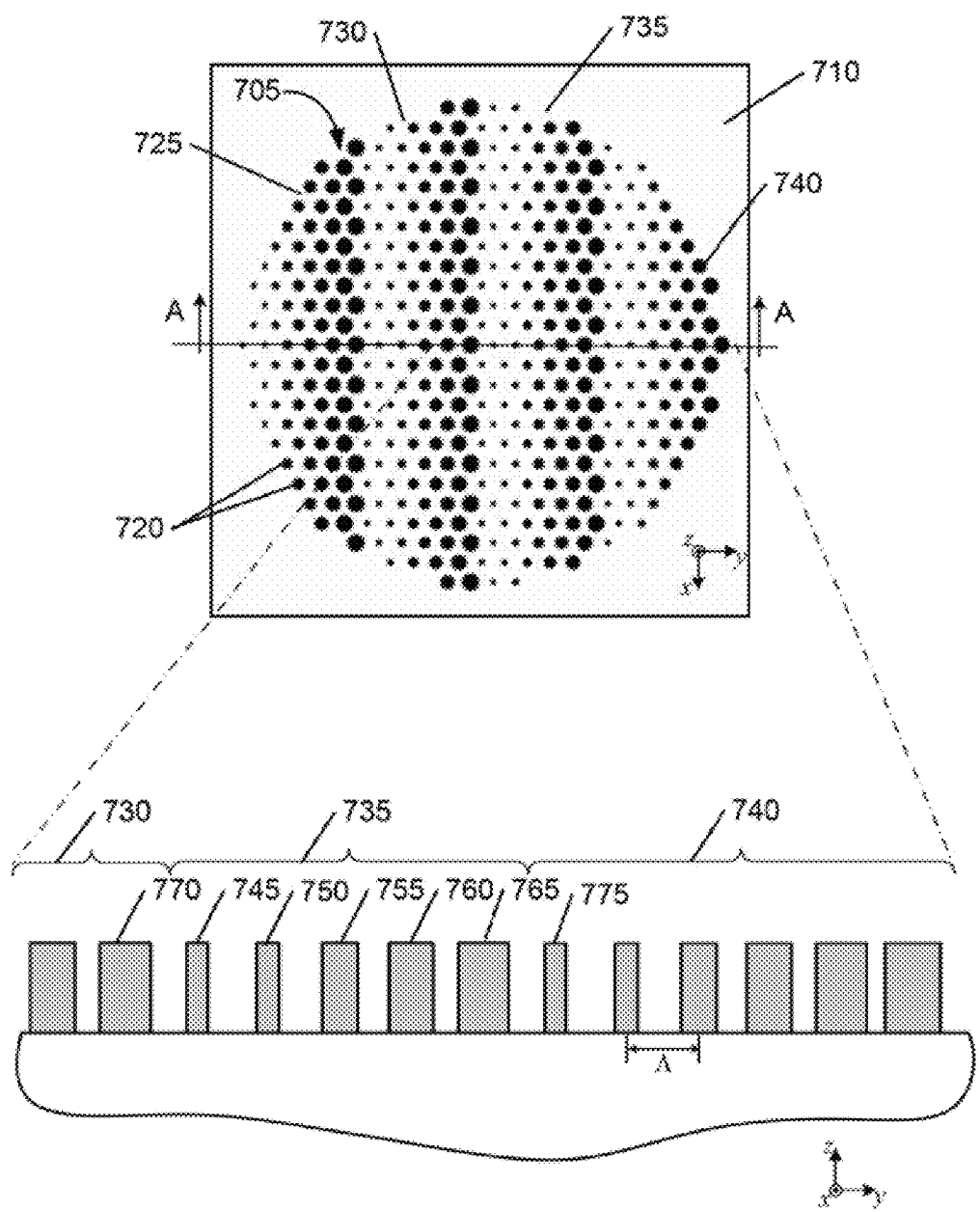

FIGS. 7A-B show isometric and top views of an example RSL. The RSL 700 includes an SWG 705 that functions as a cylindrical lens disposed on a planar surface 715 of a substrate 710. FIG. 7B shows a top view of SWG 705 configured to deflect light with an approximately 15° angle of transmission. The SWG 705 is composed of a two-dimensional hexagonal lattice of cylindrical posts represented by shaded circles 720. The hexagonal lattice of posts is characterized by a lattice constant, denoted by $\Lambda$, that corresponds to the distance between the centers of nay pair of adjacent posts.

The SWG 705 can be composed of a single elemental semiconductor, such as silicon ("Si"), amorphous silicon ("a-Si"), and germanium ("Ge"), or a compound semiconductor. The substrate 710 can be composed of material having a relatively lower refractive index than the SWG 705. For example, the substrate 710 can be composed of quartz, silicon dioxide ("SiO2"), aluminum oxide ("Al3O2"), or a polymer.

RSLs such as RSL 700 are compact and monolithic and can be fabricated with many of the same CMOS-compatible techniques used to fabricate microelectronic devices. For example, RSL 700 can be fabricated by depositing a semiconductor layer on a planar surface of a substrate using wafer bonding or chemical or physical vapor deposition. The posts comprising an SWG (e.g., SWG 705 in RSL 700) can be formed in the semiconductor layer using nanofabrication techniques such as photolithography, nanoimprint lithograph, reactive-ion etching, or roll-to-roll processing. The SWG 705 can be fabricated by forming the posts so that portions of the substrate 710 are exposed between the posts, as shown in the cross-sectional view 730.

In various embodiments, the SWG 705 is a high-contract SWG because of the relatively high contrast between the refractive index of the material comprising the SWG 705 and the refractive index of the substrate 710. For example, the elemental semiconductors and many compound semiconductors that can be used to form the SWG 705 have effective refractive indices greater than approximately 3.5 when interacting with light of a wavelength 632.8 nm. By contrast, the materials used to form the substrate 710 have effective refractive indices of approximately 1.55 when interacting with light of the same wavelength 632.8 nm.

The lattice constant $\Lambda$ of the SWG 705 is selected so that the RSL 700 does not scatter light into the substrate in an unwanted manner. Unwanted scattering can be prevented by selecting the lattice constant based on a no-scattering limit that depends on the refractive index of the substrate 710. In addition to selecting the lattice constant based on the no-scattering limit, the RSL 700 can be configured so that the desired phase difference between two posts separated by $\Lambda$ is less than $\pi$, so that the desired output phase is determined by the lattice at a high enough spatial density.

It is appreciated that the diameters of the posts comprising the SWG 705 are varied. For example, as shown in the FIG. 7B, the diameters of the posts may be varied to form different regions, such as regions 725-740. In each region, the diameters of the posts may systematically increase in the y-direction, while in the x-direction, the diameters of the posts may be constant. The pattern of systematic increase of the post diameter in the y-direction may be repeated for each region. Systematic increases in the diameters of the posts in the y-direction while holding lattice constant $\Lambda$ fixed also corresponds to an increase in the duty cycle in the y-direction. It is appreciated that the SWG 705 is also referred to as a "subwavelength grating" because the post diameters and lattice constant $\Lambda$ are less than the wavelength $\lambda$ of the light for which the SWG 405 is configured to interact.

FIG. 7B also shows a magnified yz-plane cross-section view of posts located along a portion of a line segment A-A that extends in the y-direction. The posts are approximately equally spaced in the y-direction by a fixed lattice constant $\Lambda$. The diameters of the posts within each region increases in the y-direction. In region 735, the diameters of posts 745-765 increase in the y-direction with post 745 having the smallest diameter located adjacent to the post 765 with the largest diameter along the line A-A in region 730 and the post 760 having the largest diameter. The magnified view reveals that the systematic increase in post diameters is repeated in region 740.

In various embodiments, an SWG of an RSL can be designed to have desired optical properties, such as desired deflection and/or focusing properties. In particular, the larger the post size, the longer that incident light remains trapped within the posts. As a result, a larger transmitted phase is acquired by light transmitted through regions of an SWG with posts having larger dimensions than other regions of the same SWG with posts having smaller dimensions. As SWG with desired optical properties can be obtained by varying the dimensions of the posts while holding the lattice constant fixed, varying the lattice constant while holding the dimensions of the posts fixed, or by varying the lattice constant and the dimensions of the posts.

As appreciated by one skilled in the art, the SWG of an RSL can also be designed to interact with a particular wavelength $\lambda$ of light by applying a property of Maxwell's equations that relates to a uniform scale of transformation in the design of the SWG. It is also appreciated that SWGs are not limited to a hexagonal lattice of posts, as shown in FIG. 7B. Alternatively, the lattice of an SWG can be square, rectangular, rhombic, or parallelogrammic. It is further appreciated that an SWG in an RSL can be designed to deflect transmitted light with a desired angle of transmission. For example, an RSL can include an SWG to deflect light at 10°, 15°, 20°, and so on.

Figure 8:
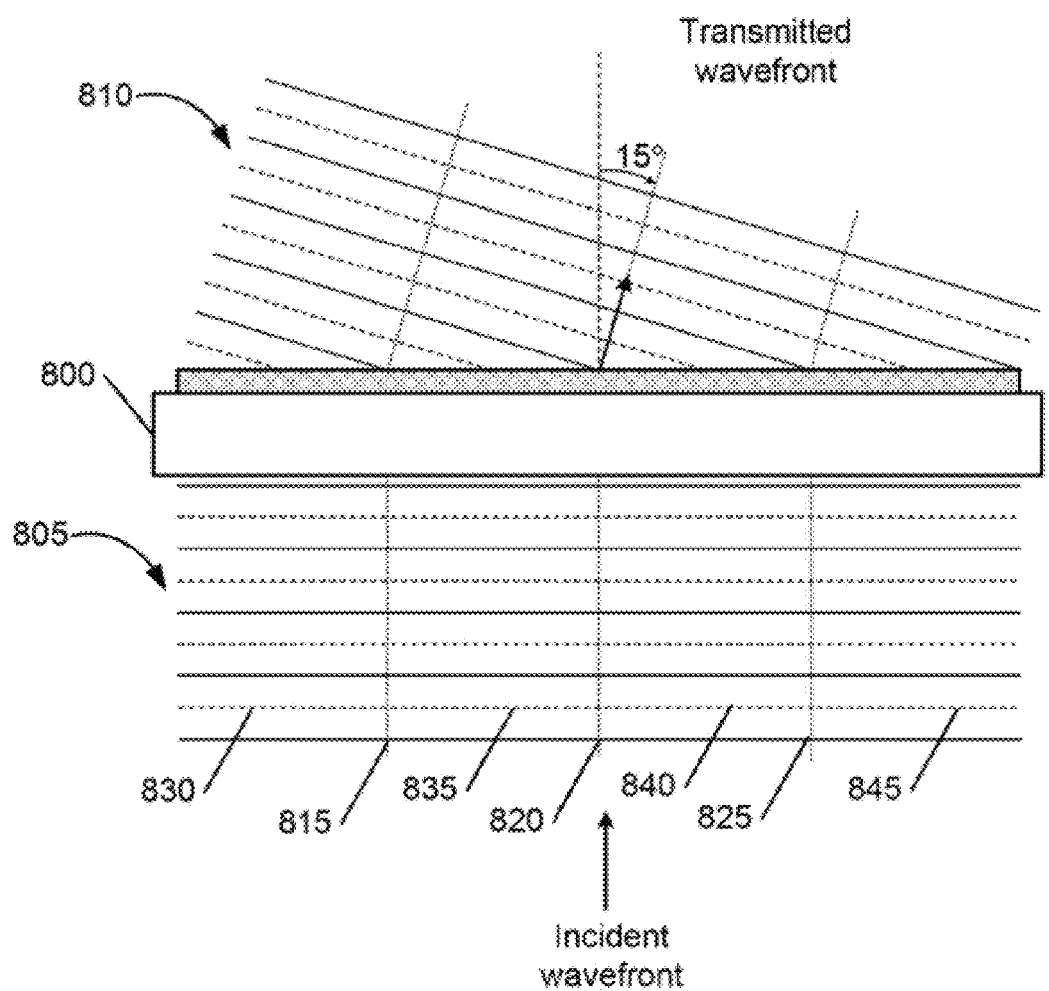
FIG. 8 illustrates a schematic diagram showing how light is transmitted through an RSL.

A schematic diagram showing how light is transmitted through an RSL is illustrated in FIG. 8. RSL 800 is shown with a snapshot of a planar incident wavefront 805 and a transmitted wavefront 810. The incident wavefront 805 strikes the RSL 800 with normal incidence and is output as the transmitted wavefront 810 with a 15° angle of transmission. Dotted lines 815-825 delineate four different segments 830-845 of the incident wavefront 805 with each segment acquiring a transmitted phase. As a result, each segment of the incident wavefront 805 is output with approximately the same 15° angle of transmission. As appreciated by one skilled in the art, each RSL in an RSL layer may be designed to deflect light at a desired angle, thereby providing multiple views to viewers.

Figure 9:
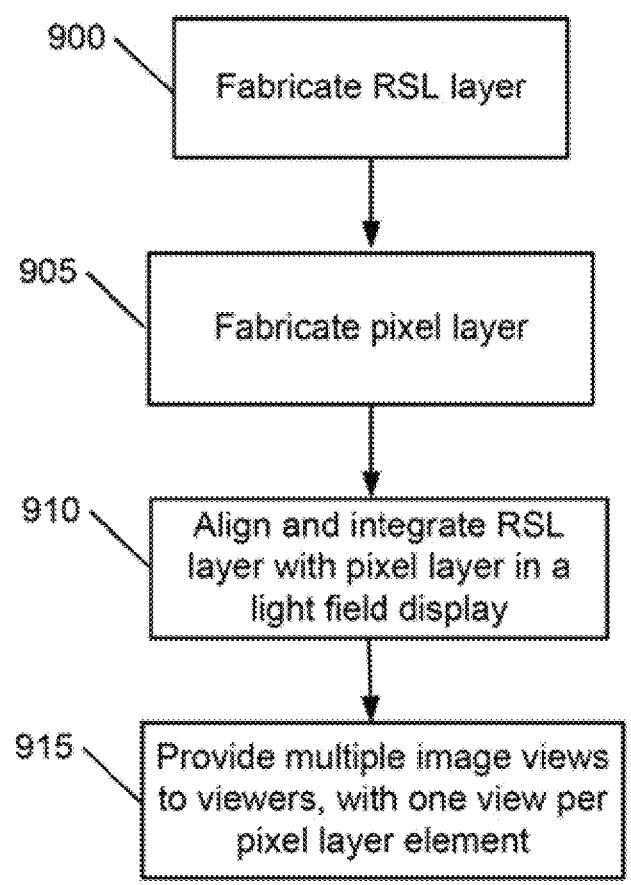
FIG. 9 is a flowchart for designing a light field display with an RSL layer.

Referring now to FIG. 9, a flowchart for designing a light field display with an RSL layer is described. First, an RSL layer having multiple RSLs is designed and fabricated using nanofabrication techniques (900). Then, a pixel layer is fabricated (905) and the RSL layer and the pixel layer are aligned and integrated to form a glasses-free light field display for multiple viewers (910). The RSL layer and pixel layer are aligned and integrated such that an element (e.g., a subpixel as shown in FIGS. 2-3 or a pixel as shown in FIGS. 4-5) in the pixel layer is able to provide an image view at a given direction (915).

Figure 10:
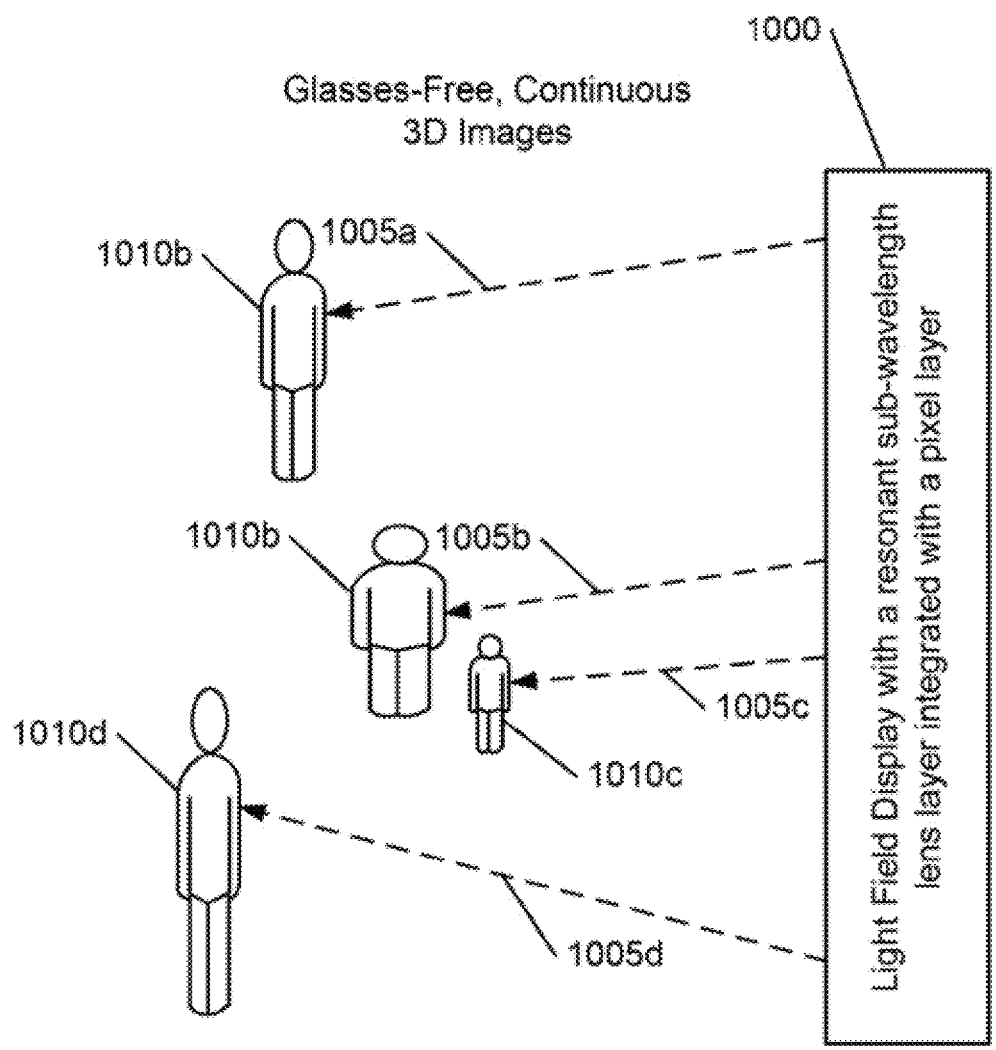
FIG. 10 illustrates a light display screen having an RSL layer integrated with a pixel layer in accordance with various embodiments.

A light display screen having an RSL layer integrated with a pixel layer in accordance with various embodiments is illustrated in FIG. 10. Display screen 100 is a light field display screen having an RSL layer integrated with a pixel layer to provide continuous, 3D images to viewers (e.g., continuous 3D images 1005*a-d* to viewers 1010*a-d*) without requiring the use of special viewing glasses. As a result, viewers of display screen 1000 (who may be located at different positions relative to the display screen 1000) perceive bright and high quality 3D images at many different views.

As appreciated by one skilled in the art, the RSL layer used in the light field display 1000 is inexpensive to manufacturing using nanofabrication techniques (e.g. roll-to-roll imprinting) and has high optical quality to provide a large number of views. It is also appreciated that the ease of fabrication of the RSLs allows individual RSLs to be used for each subpixel, as illustrated in FIGS. 2-3, or for each pixel, as illustrated in FIGS. 4-5. This allows the light from each subpixel to have a well defined direction and to be closely coupled to its corresponding pixel, thereby limiting cross-talk between pixels that cause ghosting, improving efficiency, limiting aberration, and allowing the RSLs to be defined for a narrow range of wavelengths corresponding to each color.

It is further appreciated that, as shown in FIG. 8, the phase of the transmitted wavefront is controlled by a flat surface in the RSL rather than a spherical or more complex shape as in the case of an optical lens. This improves the aberration and the optical quality of the generated images. Additionally, the use of SWGs in the RSLs enables the light energy to be deflected in the $0^{th}$ order, rather than higher orders as in conventional holographic gratings or Fresnel lenses. This results in brighter and higher quality images. Image quality is also improved as a result of the high index materials used to fabricate the RSLs. The materials (e.g. a-Si with an index of 4) allow small focal lengths and result in a greater viewing angle, decreased pixel cross-talk and improved light collection efficiency. The better optical quality and larger number of views achievable with an RSL-based light field display provides more continuous motion parallax and a glasses-free, stereoscopic image to multiple viewers.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A light field display for providing continuous 3D images to viewers at multiple views, comprising:
   a resonant subwavelength lens layer comprising a plurality of resonant subwavelength lenses;
   a pixel layer comprising a plurality of pixel layer elements, each resonant subwavelength lens integrated with an element in the pixel layer, each pixel layer element including an active matrix array comprising a plurality of subpixels and an emitter array comprising a plurality of emitters, each subpixel electrically coupled to the emitter array by a via, each emitter in the emitter array positioned to cause light to arrive at the corresponding resonant subwavelength lens from a different set of directions than those of light from another emitter in the emitter array, the corresponding resonant subwavelength lens to output the light at an angle depending on the set of directions from which the light arrives,
      wherein each emitter in the emitter array is narrower than a width of the pixel layer element, and
      wherein the angle depends on the position of the emitter along the width of the pixel layer element; and
   a circuit board connected to the pixel layer and the resonant subwavelength lens layer.

2. The light field display of claim 1, wherein a resonant subwavelength lens comprises a high contrast subwavelength grating composed of posts that extend from a substrate having a planar surface.

3. The light field display of claim 2, wherein the posts have varying dimensions and deflect transmitted light at a given angle.

4. The light field display of claim 1, wherein the resonant subwavelength lens layer including a plurality of posts of a higher refractive index material on a substrate of a relatively lower refractive index material.

5. The light field display of claim 1, wherein each emitter has a horizontal position different than that of every other emitter in the emitter array.

6. The light field display of claim 1, wherein a height of an emitter in the emitter array extends for a height of the pixel layer element.

7. The light field display of claim 1, wherein the plurality of resonant subwavelength lenses includes a cylindrical lens.

8. A method to provide continuous 3D images to multiple viewers, comprising:
   fabricating a resonant subwavelength lens layer comprising a plurality of resonant subwavelength lenses, the resonant subwavelength lens layer including a plurality of posts of a higher refractive index material on a substrate of a relatively lower refractive index material, wherein the plurality of posts are arranged in a hexagonal lattice;
   fabricating a pixel layer comprising a plurality of pixel layer elements;
   integrating each resonant subwavelength lens in the resonant subwavelength lens layer with a pixel layer element in the pixel layer; and
   providing multiple images views to the multiple viewers, with an image view provided for each pixel layer element.

9. The method of claim 8, wherein a pixel layer element comprises a pixel.

10. The method of claim 9, wherein a pixel comprises an array of subpixels.

11. The method of claim 8, wherein a pixel layer element comprises a subpixel.

12. The method of claim 8, wherein the pixel layer comprises a collimated backlight, a plurality of color filters, and a plurality of subpixels forming a plurality of pixels.

13. The method of 8, wherein the pixel layer comprises an active matrix array, an emitter array, and a plurality of pixels.

14. The method of claim 8, wherein fabricating a resonant subwavelength lens layer comprises fabricating a high contrast subwavelength grating composed of a pattern of posts with varying dimensions that extend from a substrate having a planar surface and deflect transmitted light at a given angle.

15. A resonant subwavelength lens layer for use in a light field display having a pixel layer, the resonant subwavelength lens layer comprising:
   a substrate having a planar surface; and a plurality of resonant subwavelength lenses formed on the substrate, each resonant subwavelength lens integrated with an element in the pixel layer and having a high contrast subwavelength grating composed of a pattern of posts with varying dimensions that extend from the substrate and deflect transmitted light at a given angle to provide an image view per element in the pixel layer, the plurality of resonant subwavelength lenses including a plurality of groups of contiguous lenses, a resonant subwavelength lens in one of the plurality of groups to deflect collimated, normal incidence light in a direction substantially distinct from a direction another resonant subwavelength lens in the one of the plurality of groups deflects the collimated, normal incidence light.

16. The resonant subwavelength lens layer of claim 15, wherein the posts include a higher refractive index material and the substrate includes a relatively lower refractive index material.

17. The resonant subwavelength lens layer of claim 15, wherein each resonant subwavelength lens is to deflect collimated, normal incidence light into a small horizontal direction and a large vertical direction.

18. The resonant subwavelength lens layer of claim 15, wherein a first resonant subwavelength lens is to deflect collimated, normal incidence light of a first color in a narrow direction, and wherein a second resonant subwavelength lens is to deflect collimated, normal incidence light of a second color in the narrow direction.

19. The resonant subwavelength lens layer of claim 15, wherein the pattern of posts are arranged in a hexagonal lattice.

20. The resonant subwavelength lens layer of claim 15, wherein the pattern of posts includes a repeated pattern of systematically increasing post diameter in a first direction.

* * * * *